Jan. 21, 1947.  W. R. HARDING ET AL  2,414,523
TORPEDO PROPULSION CONTROL AND MOTOR
Filed Nov. 20, 1943  2 Sheets-Sheet 1
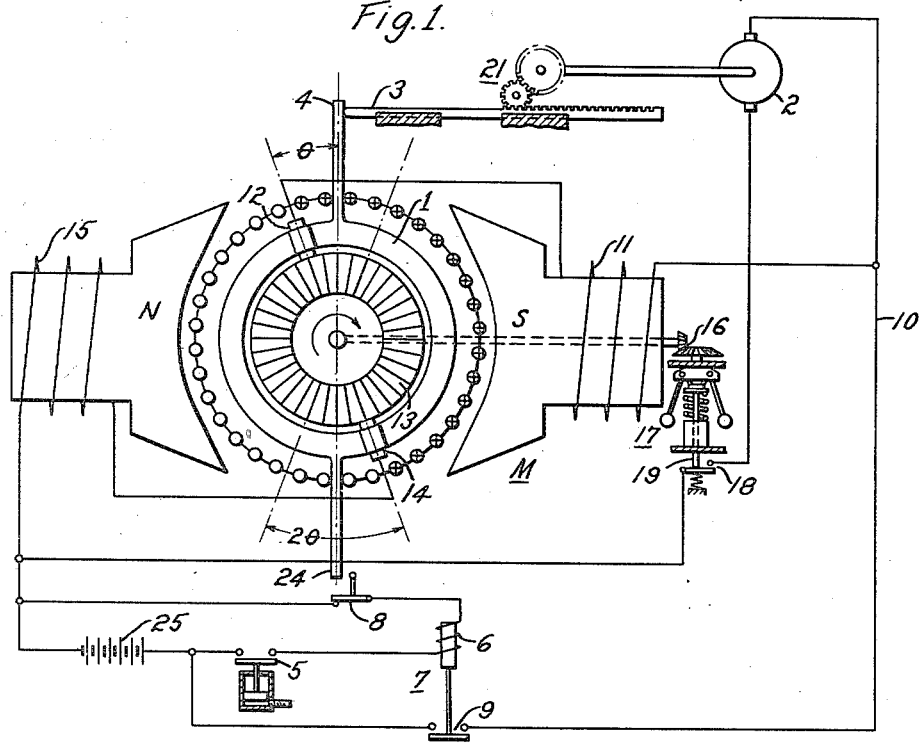
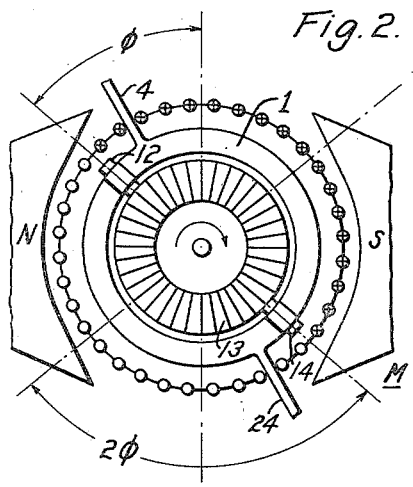
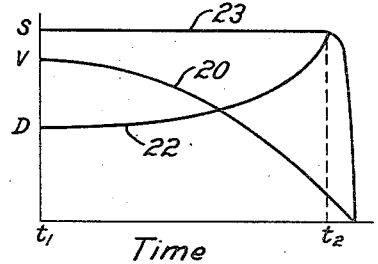
WITNESSES:
INVENTORS
William R. Harding, Albert W. Kimball,
and Raymond W. Moore.
BY
Paul E. Friedemann
ATTORNEY Patented Jan. 21, 1947

2,414,523

UNITED STATES PATENT OFFICE 2,414,523

TORPEDO PROPULSION CONTROL AND MOTOR

William R. Harding, Export, Albert W. Kimball, Wilkinsburg, and Raymond W. Moore, Edgewood, Pa., assignors to Westinghouse Electric Corporation, East Pittsburgh, Pa., a corporation of Pennsylvania Application November 20, 1943, Serial No. 511,086

9 Claims. (Cl. 172—8)

Our invention relates to a system of control, and more particularly to a control for controlling the operation of a conveyance, as, for example, a torpedo.

The prior art type of torpedoes are usually driven by a turbine operated from compressed air. As the pressure in the flasks decreases, the speed drops off considerably so that the speed of the torpedo over its entire run varies from a high speed to a relatively low speed. Such speed variation of the torpedo very materially affects the firing accuracy and also affects the range over which any accurate shots might be made.

The present war brought into use the all-electric torpedoes. However, all-electric torpedoes may have the same disadvantage since it is well known that a storage battery, whether it be a primary battery or a secondary battery, very materially decreases its terminal voltage with the degree of discharge of the battery.

One broad object of our invention is the provision of means for maintaining the speed of a torpedo at a constant value, with good commutation of the driving motor, till the battery is practically exhausted regardless of the variation of the terminal voltage of the battery.

Another object of our invention is the provision of good commutation of a series motor with changes of brush position and of current supplied to the motor.

It is an object of our invention to utilize a series motor having no commutating poles as such but having the main poles perform the functions of main poles and of commutating poles, and with the excitation so selected as to give satisfactory commutation when the brushes are shifted to maintain constant speed with change of voltage and current within the range for which the equipment is designed.

A further object of our invention is to so change the demagnetizing component of a series motor and obtain negative flux, by changes in brush position, so that the resultant effective main pole flux will have the correct value for the particular combination of voltage and current.

A broad object of our invention is to make the commutating flux of such value as to give satisfactory commutation at each combination of brush position and current through the range for which the motor is designed.

It is an important object of our invention to maintain good commutation on a series motor supplied from a voltage that decreases more and more with the passage of time from a given initial time and yet maintain substantially constant motor speed.

The foregoing objects are merely illustrative of the objects of our invention, and other objects and advantages will become readily apparent from a study of the following specification and the accompanying drawings, in which:

Figure 1 is a somewhat schematic showing of our invention illustrating the theory of operation of our system of control for maintaining constant motor speed with good commutation;

Fig. 2 illustrates the theory of operation of our system of control;

Fig. 3 shows certain curves which facilitate the disclosure of our invention;

Figure 4:
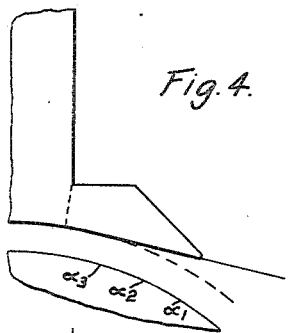
Fig. 4 illustrates one type of pole construction for obtaining good commutation.

In Fig. 1 we illustrate, for the sake of simplicity, a two-pole series motor M for driving a torpedo (not shown) from a battery B carried by the torpedo.

The use of a series motor for torpedo propulsion is in itself a novel combination, but this combination is disclosed and claimed in the copending case of Walter H. Smith, Serial No. 496,415, filed July 28, 1943, and entitled Torpedo control.

With a series motor no starting control system is needed, the commutating poles can be eliminated, the conductors are all heavier and stronger than in other motors, and thus are not so readily damaged when the torpedo is fired.

To get the very maximum out of a given system it is desirable to maintain constant speed and this is done by means of shifting the brushes of the motor. To shift the brushes we provide a suitable ring 1 which is shifted counter to the motor rotation by a small motor 2 operating the plunger 3 for rotating the ring 1 by means of arm 4.

To be better able to understand the details and the theory of our invention a study of the sequence of operation of the control may not be amiss at this point.

When the torpedo is fired from its tube a trigger switch 5 is closed either by pneumatic means, as shown, or directly from a lever actuated by a dog protruding into the firing tube.

When trigger switch 5 is closed a circuit is established from the positive terminal of the battery 25 through the trigger switch 5, actuating coil 6 of contactor 7, and limit switch 8 to the negative terminal of the battery.

Operation of the contactor 7 closes contacts 9 whereupon a circuit is established from the positive terminal of the battery through contacts 9, conductor 10, series field winding 11, a brush 12, the commutator 13, the armature winding, brush 14, and series field winding 15 to the negative terminal of the battery. The torpedo propeller is thus operated at full speed and the torpedo proceeds toward the target at full speed.

Coupled to the motor shaft, preferably at the end opposite to the propeller coupling, we provide a suitable reduction gear 16 for operating a speed responsive device, as a flyball governor 17. The weights of the governor move outwardly and almost immediately upon energization of the motor cause opening of the microswitch 18. This switch is extremely sensitive to changes of positions of plunger 19.

As the battery energy is being consumed its voltage varies as shown by curve 20 (Fig. 3). As a consequence there is a slight temporary decrease in speed. Since switch 18 is extremely sensitive to changes in position of plunger 19, the switch 18 is closed. Closure of switch 18 establishes a circuit from energized conductor 10 through the small motor 2, and switch 18 to the negative terminal of the battery.

This motor 2, through the transmission 21, operates plunger 3 toward the left, thus causing a shift of the brushes 12 and 14 in a counter-clockwise direction and in a direction opposite to the rotation of the series motor. This means that the commutating zone is shifted slightly, the demagnetizing component is increased, the negative flux, if any, is increased, the effective flux decreased, and the motor speed is increased. The instant the brushes have the new position and the speed is again normal the switch 18 is again opened and motor 2 is stopped. The motor 2 is thus caused to operate intermittently until the brushes have been shifted from a position as shown in Fig. 1 to some other position as shown in Fig. 2.

The demagnetizing turns and the negative flux, if any, for the starting position are determined by the angle $2\phi$ whereas the demagnetizing turns and the negative flux for final position are determined by the angle $2\phi$. During the shifting of the brushes the demagnetizing turns and the effect thereof will vary, with reference to time, somewhat as shown by curve 22. The result is that the speed of the torpedo, with reference to time, will vary as shown by curve 23. It is thus apparent that substantially constant speed is maintained from time $t_1$ to time $t_2$.

At time $t_2$ will actuate the limit switch 8 to open position thus disconnecting the battery from the circuits shown in Fig. 1. This operation just mentioned takes place only if the target has not been encountered between times $t_1$ and $t_2$. There are reasons, not part of this invention, for opening switch 8 and thus contacts 9 when the target is not hit.

Commutating difficulties, when the drastic speed control above discussed is utilized, may cause failure of the system with the result that the torpedo stops before it has attained its goal. These commutation difficulties can be eliminated if the commutating flux, $F_c$, is increased directly as the armature current increases.

In a series motor the current in the field and the armature are the same so there is a natural tendency for the commutating flux to vary directly with the armature current, however, because of the saturation of the iron parts this desired condition cannot, without our invention, be obtained.

Figure 5:
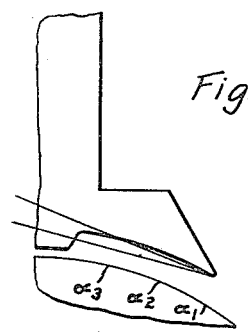
Fig. 5 illustrates a modified pole-tip construction.
Figure 4A:
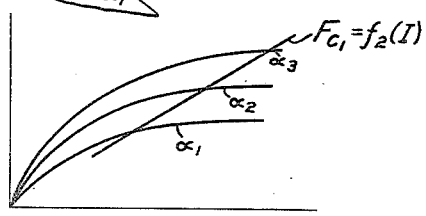
Fig. 4a illustrates the kind of commutating flux curves, as $\alpha_1$, $\alpha_2$ and $\alpha_3$ for corresponding brush positions, and commutating flux functions $Fc_1 = f_2(I)$ that can be obtained with the arrangement shown in Fig. 4.
Figure 5A:
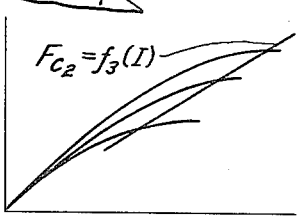
Fig. 5a illustrates the kind of commutating flux curves and commutating flux function that can be obtained with the arrangement shown in Fig. 5.

Either Figures 1, 2 and 4, or as shown in Fig. 5, constructions may be used to obtain the desired result. However, the shape of the pole face and the resultant air gap are dependent upon the proportions of the particular design and may be shapes other than those shown.

To understand how this type of pole construction operates let us here restate some of the theory of electric motors and how we obtain the correct commutating flux.

The fundamental speed equation of a direct-current motor is, $$N = \frac{V - IR}{KF}$$

or (1) $$F = \frac{V - IR}{KN}$$

In this equation:

F = magnetizing flux;
I = armature current;
R = armature circuit resistance;
V = applied voltage; and
K = a constant determined from the design of the machine.

Since the requirement is that N = a constant then F must be varied linearly as V changes.

If the speed is constant the horse power required is constant and the torque output of the motor is thus constant. The torque, T, of a direct-current motor is given by $T = K_1 F_1 I$ where $K_1$ is some other constant.

(2) Therefore $$F = \frac{T}{K_1 I}$$

From this latter equation, it is apparent that a hyperbolic relation exists between F and I. These are the two conditions which must be met to obtain the required results stated.

Figure 6:
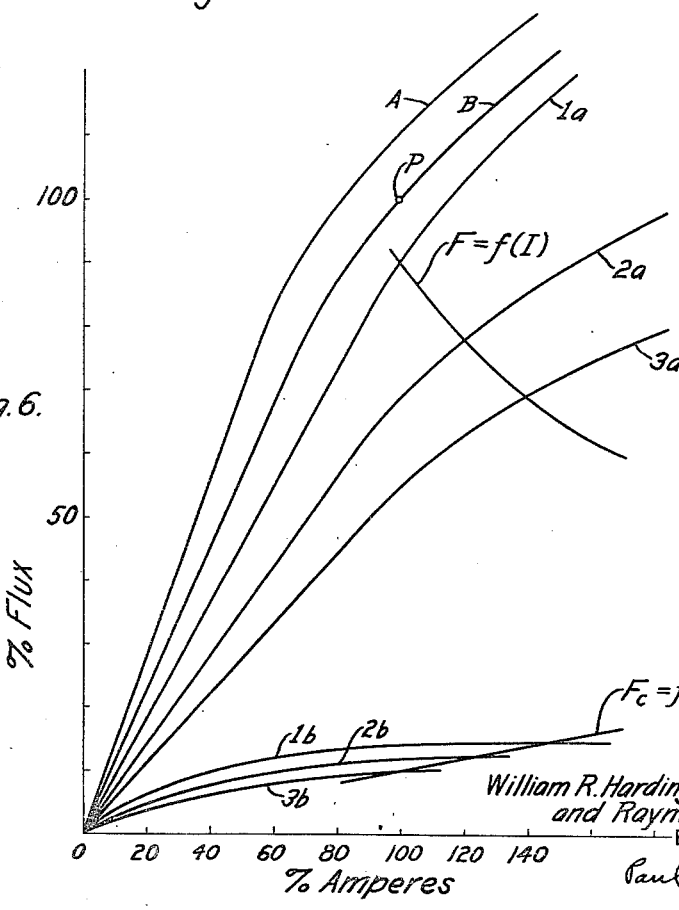
Fig. 6 illustrates some curves for determining the commutating flux function desired.

Fig. 6 shows several curves for illustrating our further contribution to the art. Curve A is a saturation curve for no-load with the motor brushes on magnetic neutral, that is, in a vertical plane in Fig. 1. Curve B is a similar saturation curve except that the motor is operating at initial full load and with brushes on magnetic neutral.

This curve B is lower than curve A, due to the effect of armature distortion and demagnetization for this load and brush position.

To obtain satisfactory commutation under the starting condition, the brushes are shifted through the angle $\theta$. This shift of brushes increases the effect of armature distortion and increases the demagnetizing componet so that the saturation curve for this load is further lowered to curve $1a$. Further shifts of the brushes required to maintain motor speed due to reduced battery voltage and consequent increased current are represented by curves $2a$ and $3a$. These brush shifts and consequent effective flux curves are such that with the increased field excitation due to the increased current the effective flux in each case is such as to give the required motor speed. The curve through the operating points is represented by the curve $$F = f(I)$$

It must be recognized that when the brush shift has reached such a value that it has caused the commutating zone to be shifted completely under the influence of the main pole field that further shift of the brushes and consequent shift of the commutating zone results in a portion of the flux becoming effective in the area of the armature normally under the influence of a south pole only. This condition, of course, also exists in the relation of a south pole to a north pole. This component has previously been referred to as negative flux. This results in a further reduction in the flux effective to produce CEMF and is therefore, reflected as a further lowering of the effective flux saturation curves as illustrated in curves $1a$ to $3a$. The initial setting of the brushes in a given design of motor may be such that the angle $\theta$ is such that the initial condition described alone is in existence or has been passed.

For any given machine the point P on the curve, as curve B, representing initial full load operation is known and by a proper selection of scales may be arbitrarily designated at 100% flux for 100% load current. The design is then, of course, such that the machine may operate satisfactorily with less flux.

We show curves for several successive brush positions far and beyond the position determined by angle $\theta$. These curves we designate $1a$, $2a$, and $3a$, respectively. Then to satisfy the constant speed condition, it is necessary to have a regulating device, our governor mechanism and electric motor 2, which shifts the brushes to cause F to vary as V varies, and to so design the motor to have F vary as an inverse function of I for various brush positions. This variation we show by the curve designated $F = f(I)$. This curve, it will be noted, is of hyperbolic character.

To satisfy the condition of good commutation it is necessary that the conductors short-circuited generate a voltage opposing the reactance voltage of these coils. This requires a commutating flux $F_c$ which exists in the zone of the short-circuited coils.

This desired $F_c$ can be obtained by having an excess of field ampere turns over the armature ampere turns at a given brush position. The reactance voltage is a linear function of current and the constants of the machine (dimensions, turns, etc.) Therefore, $F_c$ must be made a linear function of the current.

Curves $1b$, $2b$, and $3b$ are saturation curves of the magnetic circuit carrying $F_c$, the commutating flux, and illustrate how this is obtained. This magnetic circuit consists of, yoke, pole body, pole tip, pole-tip gap and armature included in the span of short-circuited conductors. Curve $1b$ corresponding to the brush position for curve $1a$ and $2b$ and $3b$ corresponding to positions for curves $2a$ and $3a$ respectively.

The relation between $F_c$ and exciting current can be plotted just as we plotted it for the active flux F, which gave the function $F = f(I)$.

To satisfy the condition of good commutation, namely, a function of $F_c$ that is a straight line, it is only necessary to so alter those parts of the magnetic circuit which do not greatly affect the active flux F. These parts are the pole tip and the pole-tip air gap. By properly altering these parts of the magnetic circuit, $F_c$ can be made a linear function of I. In Fig. 6, it will be noted that $F_c = f_1(I)$ is a straight line.

We have provided several ways for changing the characteristics of the particular parts of the magnetic circuit by means of which $F_c = f_1(I)$ can be made approximately a straight line and of such values as to give satisfactory commutation within the required range of operation. In Figs. 1, 2, and 4 the pole tip is tapered, whereas in Fig. 5 the modification is somewhat different. Figs. $4a$ and $5a$ illustrate how each of these methods gives approximately a straight-line function for $F_c$. Other shapes than those shown may be required in order to obtain saturation curves suitable for satisfactory commutation.

From the foregoing description and the figures it will be apparent that we have provided an all-electric control for an electrically driven conveyance by means of which constant speed may be obtained from a time $t_1$ to a time $t_2$ and that no damaging operations are imposed on any of the equipment.

The foregoing disclosure and the showing is merely illustrative. We do not, therefore, wish to be limited to the particular showing made but wish to be limited only the scope of the claims hereto appended.

We claim as our invention:

1. In a system of control for a direct-current motor of the series type, in combination, a source of direct-current energy having a drooping voltage characteristic, means for connecting the motor to the source of energy at a time $t$, when the voltage of the source of energy is at a maximum and for disconnecting the motor from the source of energy at a time $t_2$ when the source has been substantially exhausted and the voltage thereof is thus relatively low, means for varying the effective excitation of the motor as an inverse function of the armature current for the time period determined by the difference between $t_2$ and $t_1$ and means for changing the commutating flux in direct proportion to the changes in armature current for the same time period.

2. A system of control for an electrically propelled torpedo, in combination, a battery, a direct-current motor of the series type having no commutating poles but wherein the speed control and proper commutating flux is produced by shifting the motor brushes, means for shifting the brushes, said motor having exciting poles with greater air gaps at the pole tips than in the region of the body of the pole pieces, field windings on the pole pieces, and means responsive to variations of speed of the motor from a normal speed for shifting the brushes in such a direction as to maintain constant speed.

3. In a system of control for a conveyance, in combination, a series direct-current motor; a battery, having a drooping voltage characteristic, for energizing the motor; shiftable brushes for the motor for controlling the speed of the motor; means, responsive to relatively small speed changes of the motor, for shifting the brushes to maintain substantially constant motor speed; and means for making the commutating flux a straight-line function of the armature current.

4. In a system of control, in combination, a series motor having only main field windings, that is, no commutating field windings, shiftable brushes whereby the commutating flux may be produced by demagnetizing turns of the armature winding, means for varying the commutating flux in direct proportion to the variations in armature current, and means for varying the effective exciting flux as an inverse function of the armature current.

5. A system of control for an electrically propelled conveyance, in combination, an electric battery providing a source of direct current, a direct-current propulsion motor of the series type connected to the battery for propelling the conveyance, said motor having exciting poles provided with tapered pole tips and windings thereon connected to the battery, and control means operable as a function of the motor speed and the battery voltage for progressively decreasing the effective excitation of the field winding in such manner to compensate for the decrease in battery voltage with the degree of discharge of the battery to thus maintain the motor speed constant up to near complete exhaustion of the battery.

6. In a system of control for an electrically propelled conveyance, in combination, an electric battery providing a source of direct current, a direct-current propulsion motor of the series type connected to the battery for propelling the conveyance, said motor having exciting poles only and windings thereon, and control means operable as a function of the motor speed and the battery voltage for progressively shifting the motor brushes to produce a demagnetizing component by the motor armature current for decreasing the effective excitation of the field winding just sufficiently to compensate for the decrease in battery voltage with the degree of discharge of the battery to thus maintain the motor speed constant up to near complete exhaustion of the battery and means for varying commutating flux in direct proportion to the armature current.

7. In a system of control for an electrically propelled conveyance, in combination, a conveyance, a battery of a given capacity, a direct-current motor of the series type connected to the battery and coupled to propel said conveyance, said motor being provided with a commutator and brushes mounted on a rotatable ring for shifting the brushes circumferentially of the commutator from one position to another position, and means responsive to the motor speed for progressively shifting said ring and thus the brushes circumferentially of the commutator from the one position to the second position to thus progressively increase the demagnetizing component of the armature current whereby the motor speed is maintained constant up to near complete discharge of the battery, and means coacting with said means responsive to the motor speed for changing the commutating flux in direct proportion to the armature current.

8. In a system of control for an electrically propelled conveyance, in combination, an electric battery providing a source of direct current, a direct-current propulsion motor connected to the battery for propelling the conveyance, said motor having exciting poles only and windings thereon connected to the battery, and control means operable as a function of the motor speed and the battery voltage for progressively decreasing the effective excitation of the field winding just sufficiently to compensate for the decrease in battery voltage with the degree of discharge of the battery to thus maintain the motor speed constant up to near complete exhaustion of the battery, said control means comprising a stem connected to shift axially in proportion to changes in motor speed, a bearing for the stem, a switch operated to close by the axial shift of the stem upon changes in speed of the motor, a pilot motor energized by the closure of said switch, and means operated by said pilot motor for effecting said progressive decrease in the effective excitation of said propulsion motor and means for varying the commutating flux directly proportional to the armature current.

9. In a system of control for an electrically propelled conveyance, in combination, an electric battery providing a source of direct current, a direct-current propulsion motor of the series type connected to the battery for propelling the conveyance, said motor having exciting poles only and windings thereon connected to the battery, and control means operable as a function of the motor speed and the battery voltage for progressively shifting the motor brushes to produce a demagnetizing component by the motor armature current for decreasing the effective excitation of the field winding just sufficiently to compensate for the decrease in battery voltage with the degree of discharge of the battery to thus maintain the motor speed constant up to near complete exhaustion of the battery, said control means comprising a stem connected to shift axially in proportion to changes in motor speed, a bearing for the stem, a switch operated to close by the axial shift of the stem upon changes in speed of the motor, a pilot motor energized by the closure of said switch, and means operated by said pilot motor for effecting said progressive shifting of said motor brushes to thus effect said decrease in the effective excitation of said propulsion motor and means for varying the commutating flux in direct proportion to the armature current.

WILLIAM R. HARDING.
ALBERT W. KIMBALL.
RAYMOND W. MOORE.